(12) United States Patent
Eriksson et al.

(10) Patent No.: US 11,917,536 B2
(45) Date of Patent: Feb. 27, 2024

(54) ESTABLISHMENT OF A WIRELESS NETWORK

(71) Applicant: Axis AB, Lund (SE)

(72) Inventors: Magnus Eriksson, Lund (SE); Stefan Andersson, Lund (SE); Marcus Prebble, Lund (SE); Philip Linde, Lund (SE); Filip Björck, Lund (SE); Björn Holmstedt, Lund (SE); Tommy Stahlros, Lund (SE); Hamoud Abdullah, Lund (SE); Johan Helmertz, Lund (SE)

(73) Assignee: AXIS AB, Lund (SE)

( * ) Notice: Subject to any disclaimer, the term of this patent is extended or adjusted under 35 U.S.C. 154(b) by 268 days.

(21) Appl. No.: 17/494,835

(22) Filed: Oct. 6, 2021

(65) Prior Publication Data

US 2022/0124613 A1   Apr. 21, 2022

(30) Foreign Application Priority Data

Oct. 16, 2020   (EP) ..................................... 20202231

(51) Int. Cl.
*H04W 48/20* (2009.01)
*H04L 9/40* (2022.01)

(52) U.S. Cl.
CPC ......... *H04W 48/20* (2013.01); *H04L 63/0861* (2013.01)

(58) Field of Classification Search
CPC ............................ H04W 48/20; H04L 63/0861
See application file for complete search history.

(56) References Cited

U.S. PATENT DOCUMENTS

| 10,057,813 | B1 | 8/2018 | Likar et al. | |
|---|---|---|---|---|
| 2008/0065752 | A1* | 3/2008 | Ch'ng | H04W 24/02 709/223 |
| 2013/0115880 | A1 | 5/2013 | Dal Bello et al. | |
| 2015/0163398 | A1 | 6/2015 | Brockway, III et al. | |
| 2015/0373635 | A1* | 12/2015 | Wang | H04W 16/14 455/434 |
| 2016/0119663 | A1 | 4/2016 | Yamaguchi et al. | |

(Continued)

FOREIGN PATENT DOCUMENTS

| DE | 102016116077 A1 | 3/2018 |
|---|---|---|
| EP | 1216569 | 4/2001 |

(Continued)

*Primary Examiner* — Duc C Ho
(74) *Attorney, Agent, or Firm* — XSENSUS LLP

(57) ABSTRACT

A method is described for initiating a wireless network to connect an electronic device among a set of first-type electronic devices with a second-type electronic device. The method comprising: receiving, at a service server configured to service the set of first-type electronic devices, data pertaining to a user-id; retrieving, from a database, a unique network configuration associated with the user-id, wherein the unique network configuration is known beforehand by the second-type electronic device; selecting, at the service server, an electronic device among the set of first-type electronic devices; and sending, to the selected electronic device, the unique network configuration associated with the user-id for allowing the selected electronic device to initiate a wireless network using the unique network configuration associated with the user-id.

16 Claims, 2 Drawing Sheets

(56) References Cited

U.S. PATENT DOCUMENTS

| | | |
|---|---|---|
| 2018/0234848 A1 | 8/2018 | Cohen et al. |
| 2018/0288818 A1 | 10/2018 | Hillen |
| 2020/0106947 A1 | 4/2020 | Yokomitsu et al. |
| 2020/0281030 A1 | 9/2020 | Kopchinsky et al. |

FOREIGN PATENT DOCUMENTS

| | | |
|---|---|---|
| EP | 1494443 A1 | 1/2005 |
| EP | 1511235 A1 | 3/2005 |
| JP | 2014-175892 A | 9/2014 |
| WO | 01/24487 A2 | 4/2001 |
| WO | 01/24487 A3 | 4/2001 |
| WO | 2014/143761 A2 | 9/2014 |

\* cited by examiner

ESTABLISHMENT OF A WIRELESS NETWORK

CROSS-REFERENCE TO RELATED APPLICATION

This application claims priority from European Patent Application No. 20202231.5, filed on Oct. 16, 2020, the contents of which are incorporated by reference herein in its entirety.

TECHNICAL FIELD

The present invention relates to establishing a wireless network between an arbitrary electronic device among a set of first-type electronic devices and a second-type electronic device.

BACKGROUND

Establishing a wireless network between two electronic devices so that they may communicate with each other is common today. However, establishing such a wireless network between two electronic devices may be troublesome and may require various amount of interaction from the physical user(s) of the electronic devices. It may it be especially troublesome to establish a wireless network between an electronic device among a set of first-type electronic devices and a second-type electronic device, wherein the electronic device among the set of first-type electronic devices is different between different sessions of establishing the wireless network.

An example of such a scenario is when an electronic device, e.g. a mobile phone, is to be connected with a portable camera, e.g. a Body Worn Camera, BWC, for instance to view captured video clips. Several BWCs may be included in a system and may be in a docked state connected to and managed by a service server. During different network sessions, such as during different work shifts for a police officer, the police officer may wear and use different BWCs. A BWC is typically checked-out from a bay of a docking station at a start of a work shift and checked-in at the end by putting the BWC back in the same or another bay of the docking station for charging and data extraction.

It is desirable to provide a user-friendly and automatic connection process which connects the second-type electronic device, e.g. a mobile phone or any other electronic viewing device of a police officer, and a selected one of a set of first-type electronic devices, e.g. one BWC among the set of BWCs, regardless of which electronic device among the set of first-type electronic devices that is used during a session, e.g. regardless of which BWC that is checked out to a police officer during a specific work shift.

DE102016116077A1 relates to a desk-sharing or 'hot desking' environment, where a fixed telephone unit is installed at each individual workstation and users carry with them personal Bluetooth headsets that function only after being paired with the relevant telephone unit. A user who is allocated a new workstation—and thus a new telephone unit—may save the trouble of pairing the headset, and instead let the new telephone unit adopt the old telephone unit's Bluetooth MAC address. The Bluetooth MAC address is retrieved from a database. The telephone number and personal settings such as keypad shortcuts may be loaded together from the database with the device address.

EP1511235A1 discloses a pairing server which stores a Bluetooth device address BD_ADDR for each registered user. The device address can be requested from the pairing server and transferred directly to a network-connected terminal when a new portable device is to be paired with the terminal. Additional data including address book, keypad shortcuts or call forward settings can be loaded from the pairing server as well. The terminal may be a PC or phone.

US2013115880A1 is concerned with a scenario where a user connects a personal Bluetooth headset to one of multiple available thin clients. To facilitate the connection process and subsequent roaming, a server retrieves a previously used Bluetooth address ("pseudo hardware address") which the thin client receives and adopts.

SUMMARY OF THE INVENTION

In view of the above, it is an object of the present invention to provide means for facilitating establishing of a wireless network to be used to connect an electronic device among a set of first-type electronic devices with a second-type electronic device.

The invention is defined by the independent claims.

According to a first aspect a method for initiating a wireless network (e.g., a Wi-Fi network) to be used to connect an electronic device among a set of first-type electronic devices with a second-type electronic device is provided. The first-type electronic devices may be portable devices, particularly the different BWCs discussed above in the background section, and the second-type electronic device may be the mobile phone discussed above in the background section. However, it is realized and also discussed below in the detailed description, that the first and second-type electronic devices may be other kind of electronic devices. The method comprises: receiving, at a service server configured to service the set of first-type electronic devices, data pertaining to a user-id; retrieving, from a database, a unique network configuration associated with the user-id, wherein the unique network configuration is known beforehand by the second-type electronic device; selecting, at the service server, an electronic device among the set of first-type electronic devices; and sending, to selected electronic device, the unique network configuration associated with the user-id for allowing the selected electronic device to initiate a wireless network using the unique network configuration associated with the user-id.

The user-id (user identity, or user identifier) is a means or data to identify a physical user of one of the first-type electronic devices. The physical user is set to use an arbitrary one of the first-type electronic devices during a session. For example, the user-id may be a user-id of a police officer who is set to use a BWC during a work-shift (the BWC being any one of the BWCs, i.e. an arbitrary one of the BWCs).

The unique configuration may be specific to a device-id (or device identity, or device identifier) or it may be not device-id specific.

By the present method it is made possible to establish a network connection being dependent upon a user-id of one electronic device among the set of first-type electronic devices and the second-type electronic device. Hence, it may be said that a network connection between the user-id of the first-type electronic device and the second-type electronic device may be established. This concept facilitates connection between the second-type electronic device and the first-type electronic device. More precisely, the second-type electronic device does not need to know to which exact first-type electronic device among the set of first-type electronic devices it is to be connected to. Instead, the second-type electronic device only needs to know to which user-id it is to connect to. Or, more precisely, the second-type electronic device knows characteristics of a wireless network associated with the user-id it is to connect to. The inventive concept is thus contrary to the common approach of establishing a network connection between hardware-ids. Hence, the present method provides a user-id specific network, instead of a device-id specific network. By this difference, the second-type electronic device does not need to know and connect to a different network for different first-type electronic device. The user-id specific network is achieved by informing the second-type electronic device of the unique network setting associated with a user-id and by informing a selected one of the first-type electronic devices about the user-id specific network setting to be used for setting up a network for a specific network session. The act of informing the second-type electronic device about the unique network setting associated with a user-id may be made during a setup phase. The act of selecting one of the first-type electronic devices and informing the selected one of the first-type electronic devices about the user-id specific network setting to be used for setting up a network for a specific network session may be made during an operational phase.

The act of selecting an electronic device among the set of first-type electronic devices may be based on one or more of a battery status, and an available memory capacity of the electronic devices of the set of first-type electronic devices. By this a suitable one of the electronic devices of the set of first-type electronic devices may be selected for a specific session.

Receiving data pertaining to the user-id may comprises one or more of: registering personal identification of the user, registering a biometric identification of the user, receiving user input corresponding to a selection of the user-id in the database, and sending user credentials from the second-type electronic device to the service server. In addition to these steps, it is ensured that the user-id is known beforehand by the second-type electronic device.

The acts of receiving data pertaining to a user-id, retrieving a unique network configuration associated with the user-id, selecting an electronic device among a set of first-type electronic devices, and sending the unique network configuration associated with the user-id to the selected electronic device may form part of an operational phase. The method may further comprise a setup phase. The setup phase may be configured to be executed before the operational phase. The setup phase may comprise: associating the user-id with the unique network configuration; providing the second-type electronic device with the unique network configuration in association with the user-id; and saving the unique network configuration in association with the user-id in the database.

Providing the second-type electronic device with the unique network configuration in association with the user-id may comprise one or more of providing a QR-code, providing a bar code, manual input, transmission from the service server, retrieving from the database.

The setup phase may further comprise: sending, to any one of the electronic devices in the set of first-type electronic devices, the unique network configuration associated with the user-id for allowing the any one of the electronic devices in the set of first-type electronic devices to initiate a wireless network using the unique network configuration associated with the user-id; and receiving information from said any one of the electronic devices in the set of first-type electronic devices that the second-type electronic device has successfully connected to said any one of the electronic devices in the set of first-type electronic devices. The act of saving the unique network configuration associated with the user-id in the database may be performed on a condition that the information that the second-type electronic device has successfully connected to said any one of the electronic devices in the set of first-type electronic devices has been received.

The act of sending the unique network configuration may include causing the selected electronic device to act as a Wi-Fi access point or Wi-Fi router.

According to a second aspect a non-transitory computer-readable recording medium is provided. On the non-transitory computer readable recording medium, there are stored instructions for implementing the method according to the first aspect, when executed on a device having processing capabilities. The device is preferably the service server.

According to a third aspect a service server configured to service a set of first-type electronic devices (e.g., portable electronic devices) is provided. The service server comprises control circuitry. The control circuitry is configured to execute: a user-id function, a network configuration retrieving function, an electronic device selecting function, and a wireless network set-up function. The user-id function is configured to receive data pertaining to a user-id. The network configuration retrieving function is configured to, from a database, retrieve a unique network configuration associated with the user-id. The unique network configuration may be device-id specific or not device-id specific. The electronic device selecting function is configured to select an electronic device among the set of first-type electronic devices. The wireless network set-up function is configured to send, to the selected electronic device, the unique network configuration associated with the user-id. This may allow the selected electronic device to initiate a Wi-Fi network using the unique network configuration associated with the user-id.

The control circuitry may further be configured to execute a setup function. The setup function is configured to associate the user-id with the unique network configuration; provide the unique network configuration in association with the user-id to a second-type electronic device; and save the unique network configuration in association with the user-id in the database.

The electronic device selecting function may be configured to base the selection on one or more of a battery status, and an available memory capacity of the electronic devices of the set of first-type electronic devices.

The service server may further comprise a plurality of docking bays for the electronic devices of the set of first electronic devices. The respective docking bay may be configured to charge the respective electronic device, extract data from the respective electronic device, and/or transfer data to the respective electronic device.

The database may form part of the service server. The database may comprise a plurality of unique network configurations associated with user-ids. Hence, the database may comprise a plurality of user-ids, each user id being associated with a unique network configuration.

The database may further comprise certificates associated with the respective unique network configuration and the user-id.

The above-mentioned features of the method, when applicable, apply to this third aspect as well. In order to avoid undue repetition, reference is made to the above.

According to a fourth aspect a system is provided. The system comprises a service server according to the third aspect and a plurality of first-type electronic devices constituting the set of first-type electronic devices.

The first-type electronic devices may be portable digital video cameras, preferably body worn cameras.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or acts of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to appended figures. The figures should not be considered limiting; instead they are used for explaining and understanding.

As illustrated in the figures, the sizes of layers and regions may be exaggerated for illustrative purposes and, thus, are provided to illustrate the general structures. Like reference numerals refer to like elements throughout.

In FIG. 1, a second-type electronic device configured to connect to any one of the electronic devices in the set of first-type electronic devices is also illustrated.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
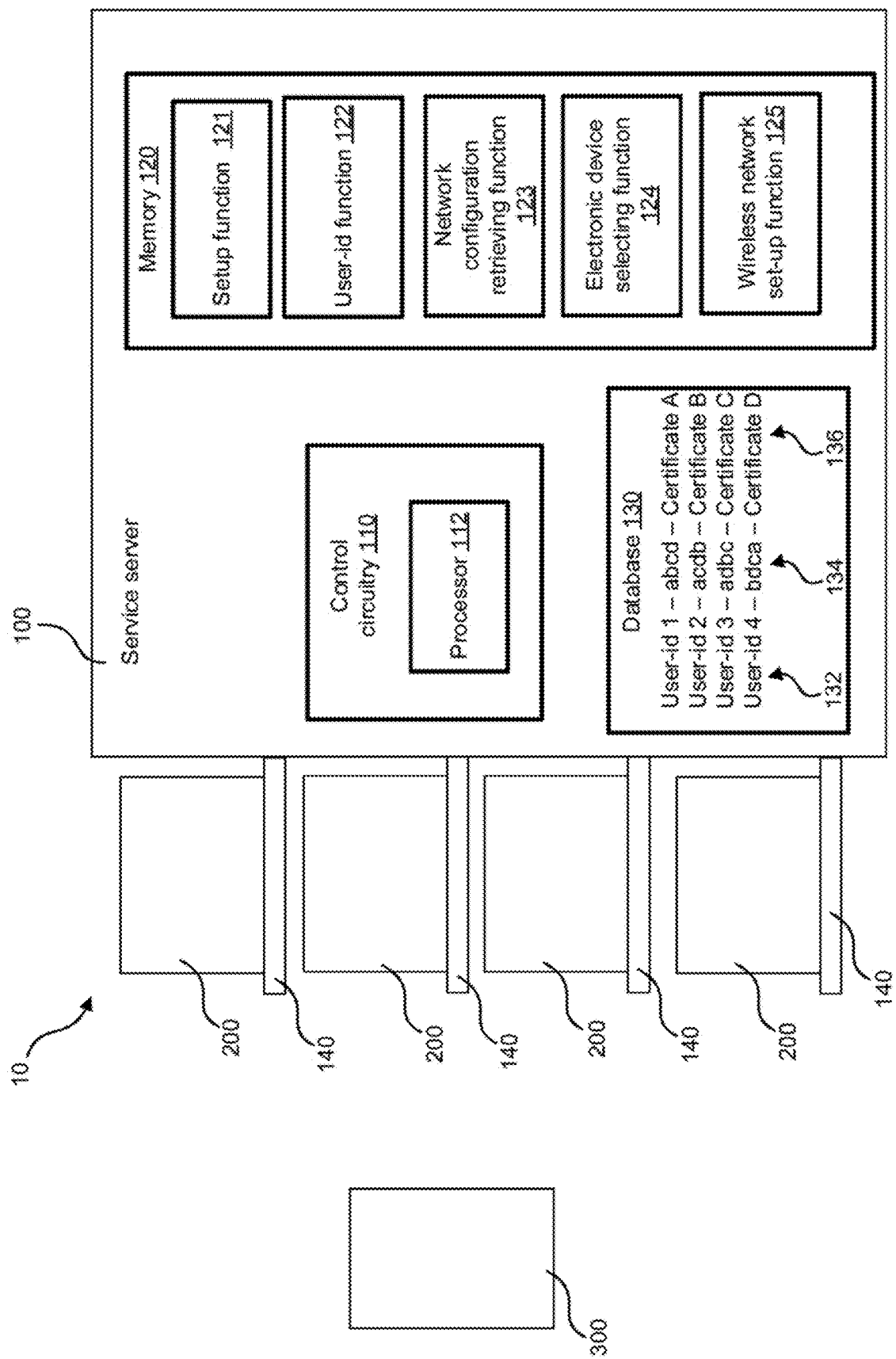
FIG. 1 illustrates a service server configured to service a set of first-type electronic devices.

FIG. 1 illustrates a service server 100 configured to service a set of first-type electronic devices 200. The service server 100 and the set of first-type electronic devices 200 may be seen as constituting a system 10.

The first-type electronic devices 200 may be portable electronic devices. The first-type electronic devices 200 may be mobile digital video cameras. Examples of mobile digital video cameras are body worn cameras, BWCs. A BWC may be worn by a person, e.g. a police officer. A BWC may be worn by an animal, e.g. a police dog. The mobile digital camera may be a dash camera mountable to a vehicle or fixedly mounted to a vehicle. The first-type electronic devices 200 may all belong to a same type of electronic device. Embodiments of the present invention are particularly suited for use with first-type electronic devices 200 which are interchangeable from a functional point of view. Concretely, the police officer in the example can expect to obtain the same services from any of the BWCs in the set. Generally speaking, the BWCs in the docking bays differ among themselves merely with respect to properties unrelated to the BWCs' function, e.g., with respect to battery status, usage history, serial number, external appearance etc.

In FIG. 1, a second-type electronic device 300 is also illustrated. The second-type electronic device 300 is configured to connect to electronic devices 200 of the set of first-type electronic devices 200. The second-type electronic device 300 may, e.g., be a portable electronic device comprising a display, e.g. a mobile phone, a laptop, or a tablet. The second-type electronic device 300, once connected to an electronic device of the set of first-type electronic devices 200 over a wireless network, may be configured to receive a video stream from the first-type electronic device 200 it is connected to via the wireless network. However, also other kind of data may be transmitted between the second-type electronic device 300 and the electronic device of the set of first-type electronic devices 200 it is connected to via the wireless network.

The second-type electronic device 300 may be a general-purpose electronic device running an application. The general-purpose electronic device may be a smartphone, a tablet, a laptop or the like. The general purpose electronic device running the application may be referred to as a Body Worn Assistant, BWA, device and the application may be referred to as the BWA. The BWA on the BWA device may be used for viewing a video stream feed received from a BWC. The BWA may be associated with a first police officer. According to one example, a BWC to which the BWA is to be connected is associated with the first police officer. Once the BWA device and the BWC associated with the first police officer are connected, the first police officer may view a video stream of the BWC via the BWA. Further, the first police officer may control the BWC associated with the first police officer via the BWA. According to another example, a BWC to which the BWA is to be connected is associated with another police officer or even a police dog. Once the BWA and the BWC associated with the another police officer, or the police dog, are connected, the first police officer may view a video stream of the BWC via the BWA. Further, the first police officer may control the BWC associated with the another police officer, or the police dog, via the BWA. As is readily understood by the skilled person other scenarios exist for connecting a second-type electronic device to an electronic device among a set of first-type electronic devices, wherein the electronic device among the set of first-type electronic devices is different for different sessions. For example, the second-type electronic device may be a device used for controlling a different one of a set of cars, or other vehicles, in different sessions.

The service server 100 is configured to service/manage the electronic devices 200 of the set of first-type electronic devices 200. Particularly, the service server 100 is configured to provide the electronic devices 200 of the set of first-type electronic devices 200 with information needed for setting up a wireless network to which the second-type electronic device can connect. This will be discussed in more detail below. The service server 100 may be configured to service/manage the electronic devices 200 of the set of first-type electronic devices 200 in other ways as well. The service server 100 may manage charging of the respective first-type electronic device 200. The service server 100 may extract data from the respective first-type electronic device 200. The extracted data may be video recorded by the first-type electronic device 200 being a portable video camera, e.g. a BWC. The service server 100 may transfer data to the respective first-type electronic device 200, transferred data may be new firmware for updating the respective first-type electronic device 200.

A connection for data transfer between the service server 100 and the respective electronic device 200 of the set of first-type electronic devices 200 may be wired. Particularly, a wired connection may be present as long as the respective electronic device 200 is docked to the service server 100. For this purpose, the service server 100 may comprise docking bays 140 for docking the electronic devices 200 of the set of first-type electronic devices 200. According to one example, there will be no data connection between the service server 100 and an electronic device 200 of the set of first-type electronic devices 200 once the electronic device 200 is removed from the docking bay 140. Further, in one scenario the second-type electronic device 300 has no means of communicating with the service server 100.

The service server 100 comprises control circuitry 110 and a memory 120. The control circuitry 110 is configured to carry out overall control of functions and operations of the service server 100. The control circuitry 110 may comprise a processor 112, such as a central processing unit, microcontroller, or microprocessor. The processor 112 is configured to execute program code stored in the server memory 120, in order to carry out functions and operations of the service server 100. The memory 120 may be one or more of a buffer, a flash memory, a hard drive, a removable medium, a volatile memory, a non-volatile memory, a random access memory RAM, or another suitable device. In a typical arrangement, the memory 120 may include a non-volatile memory for long term data storage and a volatile memory that functions as system memory for the control circuitry 110. The memory 120 may exchange data with the control circuitry 110 over a data bus. Accompanying control lines and an address bus between the memory 120 and the control circuitry 120 also may be present.

Functions and operations of the service server 100 may be embodied in the form of executable logic routines (e.g., lines of code, software programs, etc.) that are stored on a non-transitory computer readable medium (e.g., the memory 120) of the service server 100 and are executed by the control circuitry 110 (e.g., using the processor 112). Furthermore, the functions and operations of the service server 100 may be a stand-alone software application or form a part of a software application that carries out additional tasks related to the service server 100. The described functions and operations may be considered a method that the corresponding device is configured to carry out. Also, while the described functions and operations may be implemented in software, such functionality may as well be carried out via dedicated hardware or firmware, or some combination of hardware, firmware, and/or software.

The control circuitry 110 is configured to execute a user-id function 122. The user-id function 122 is configured to receive data pertaining to a user-id 132. The user-id 132 is a user-id of a physical user intending to start using an electronic device 200 among the set of first-type electronic devices 200. The receiving of the data pertaining to the user-id 132 may be made in various ways. The user-id function 122 may receive the user-id 132 by one or more of registering a personal identification and registering a biometric identification. The personal identification and/or the biometric identification may then be compared with user-ids in order to find a match. The personal identification and/or the biometric identification may form the user-id or at least a part of the user-id. It is understood that user-ids may be formed in various known ways. Alternatively, or in combination, the user-id function 122 may receive the user-id 132 by registering input corresponding to a selection of the user-id 132 among a plurality of user-ids. The plurality of user-ids may be preregistered in the service server 100. According to another example, the user-id function 122 may receive the user-id 132 by receiving user credentials from the second-type electronic device 300.

In one exemplifying scenario a user intending to start using an electronic device 200 among the set of first-type electronic devices 200, i.e. checking out an electronic device 200 among the set of first-type electronic devices 200, is by herself presenting the personal identification and/or the biometric identification, selecting the user-id among a plurality of user-ids, or a second-type electronic device 300 associated with the user is transmitting user credentials to the service server 100. In another exemplifying scenario, the check-out may be performed by another person, i.e. another user.

The control circuitry 110 is configured to execute a network configuration retrieving function 123. The network configuration retrieving function 123 is configured to retrieve a unique network configuration 134 associated with the user-id 132. Typically, this is achieved by accessing a database 130 comprising a plurality of user-id 132 each associated with a unique network configuration 134. In this context unique is to be interpreted as that two different first-type electronic devices 200 of the set of first-type electronic devices cannot be assigned the same network configuration 134. Hence, each user-id in the system 10 is to be associated with a unique network configuration 134. Association between user-ids 132 and unique network configuration 134 may be achieved in a setup phase. This will be discussed in more detail below. The unique network configuration 134 may, e.g., be a unique Service Set Identifier, SS ID. There are also other network settings that may be altered for making the network configuration unique, e.g., band/frequency, channel, encryption scheme, encryption keys, IP network addresses, etc. It also to be understood that other types of wireless network connections than Wi-Fi may be used.

The database 130 may form part of the service server 100. Alternatively, the database 130 may be a database accessible by the service server 100. Yet alternatively, the database 130 may a distributed database 130 being located in part on the service server 100 and in part on other device(s) accessible by the service server 100. The database 130 may further comprises certificates 136 associated with the respective unique network configuration 134 and user-id 132. The use of the certificates 136 will be elaborated on below. But in short, the certificates 136 may be used to increase the security of a network connection to be established using the respective unique network configuration 134.

The control circuitry 110 is configured to execute an electronic device selecting function 124. The electronic device selecting function 124 is configured to select an electronic device among the set of first-type electronic devices 200. By this the electronic device selecting function 124 is selecting one electronic device among the set of first-type electronic devices 200 to be checked-out, i.e. be ready to be removed from its docking bay and be used as a wearable device. Typically, a different electronic device is checked out for different sessions. The electronic device selecting function 124 may be configured to base the selection on which one of the electronic devices among the set of first-type electronic devices 200 to check-out on one or more parameters. The one or more parameters may comprise a battery status, e.g. state of charge, age, capacity of a battery of the electronic devices 200 of the set of first-type electronic devices 200. The one or more parameters may comprise available memory capacity of the electronic devices 200 of the set of first-type electronic devices 200. The selection does not need to be performed based on which user-id as input.

The control circuitry 110 is configured to execute a wireless network set-up function 125. The wireless network set-up function 125 is configured to send, to the selected/checked-out electronic device among the set of first-type electronic devices 200, the unique network configuration 134 associated with the user-id 132. Upon the selected/checked-out electronic device among the set of first-type electronic devices 200 have received the unique network configuration 134 associated with the user-id 132 it may set-up a network connection, e.g. a Wi-Fi network. More precisely, the selected/checked-out electronic device 200 having received the network configuration 134 may act as (initialize itself as) a Wi-Fi access point, to which one or more Wi-Fi mobile stations can connect. The present disclosure uses the Wi-Fi related terms access point and mobile station in a sense consistent with their meaning in the IEEE 802.11 series of wireless communication standards. The second-type electronic device 300 in particular may act as a Wi-Fi mobile station and obtain connectivity from the selected/checked-out electronic device 200, whereby a Wi-Fi connection is established. Further devices, including peripheral units associated with the second-type electronic device 200, may connect to the same Wi-Fi network provided by the selected/checked-out electronic device 200. Alternatively, the selected/checked-out electronic device 200 may provide equivalent Wi-Fi connectivity to the second-type electronic device 300 by acting as a Wi-Fi router.

The set-up of the network connection may be initiated by the physical user of the selected/checked-out electronic device among the set of first-type electronic devices 200. Alternatively, the set-up of the network connection may be made automatically once the selected/checked-out electronic device among the set of first-type electronic devices 200 receives the unique network configuration 134 associated with the user-id 132. The set-up network connection is unique for the user-id 132. Other devices, e.g. second-type electronic devices already knowing the unique network configuration 134 associated with the user-id 132 may the connect to the selected/checked-out electronic device among the set of first-type electronic devices 200. Such a connection by a second-type device already knowing the unique network configuration 134 associated with the user-id 132 may be established automatically, i.e. without the need for a physical person actively selecting the network in network configuration settings or the like. Optionally, the certificate 136 associated with the user-id 132 may be exchanged and verified over the connection. Upon successful verification, the connection may be allowed to continue. Hence, a more secure connection may be established.

The user-id function 122, the network configuration retrieving function 123, the electronic device selecting function 124 and the wireless network set-up function 125 may all be executed during an operational phase. The operational phase may be run once every time one electronic device among the set of first-type electronic devices 200 is to be selected/checked-out for a session, e.g. a work shift. Once the work session has ended the selected/checked-out first-type electronic device 200 may returned to a connected state with the service server 100 and checked-in again. When the first-type electronic device 200 has been checked in, the network connection may be disconnected. The disconnection of the network connection may be managed by the wireless network set-up function 125. Further, once the first-type electronic device 200 is checked in a wired connection between the first-type electronic device 200 and the service server 100 may be established.

The control circuitry 110 may further be configured to execute a setup function 121. The setup function may be used during a setup phase. The setup phase may be initiated a first time a specific user-id is registered at the service server 100. The setup function 121 may hence be configured to register a user-id 132. The setup function 121 is further configured to associate the registered user-id 132 with a unique network configuration 134. As an example, the network configuration 134 may be made unique by providing it with a randomly generated SSID. The unique network configuration 134 in association with the user-id 132 may be saved in the database 130. This act may be performed by the setup function 121. The setup function 121 may further be configured to provide the unique network configuration 134 in association with the user-id 132 to the second-type electronic device 300. In this manner, the unique network configuration 134 in association with the user-id 132 may be known by the second-type electronic device 300. There are numerous ways for the setup function 121 to provide the unique network configuration 134 in association with the user-id 132 to the second-type electronic device 300. According to non-limiting examples, the act of providing the unique network configuration 134 in association with the user-id 132 to a second-type electronic device 300 may comprise one or more of providing a QR-code, providing a bar code, manual input, transmission from the service server 100, and retrieving from the database 130. Optionally, also the certificate 136 may be provided to the second-type electronic device 300. The QR-code and or the bar code may comprise codified or non-codified data pertaining to the unique network configuration 134 in association with the user-id 132 (and optimally the certificate 136).

Hence, the setup phase is performed when a second-type electronic device 300 and user-id 132 is to be paired. The second-type electronic device 300 and user-id 132 may or may not be associated with the same physical person. Once paired, the second-type electronic device 300 and user-id 132 do not need to go through the setup phase again. During the setup phase the second-type electronic device 300 is informed about which unique network configuration that a user-id is associated with. A user-id is thus given a unique network configuration and the unique network configuration is communicated to the second-type electronic device 300. The second-type electronic device 300 may be informed about the unique network configuration from the service server 100. Optionally, in order to increase the security of a connection a certificate 136 between second-type electronic device 300 and the user-id 132 may be setup. The certificate 136 may be setup from the service server 100 and communicated to the second-type electronic device 300. The certificate 136 may be exchanged during the setup phase to verify the setup. The certificate 136 may be stored in the database 130 of the service server 100.

Figure 2:
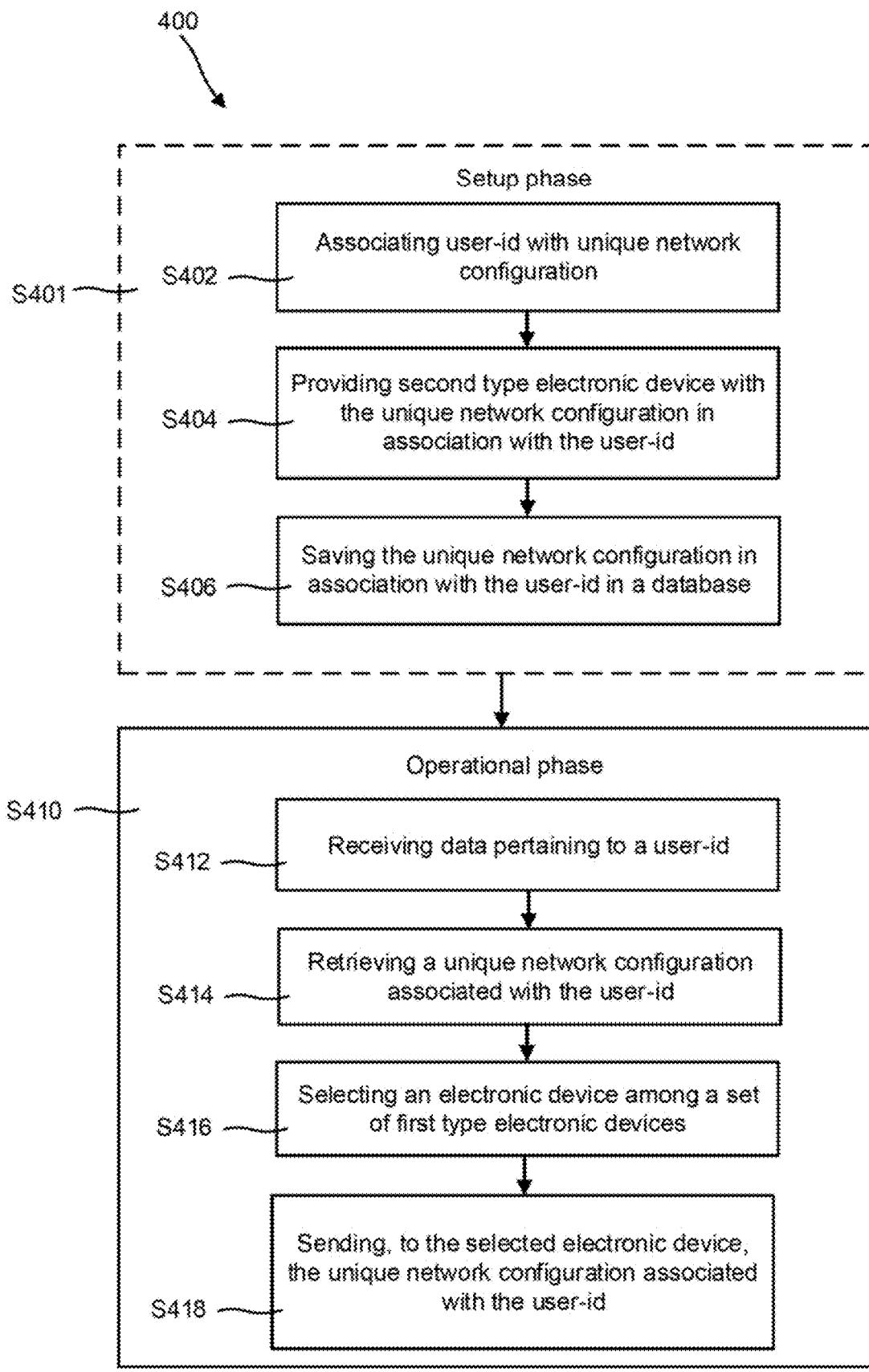
FIG. 2 is a block scheme of a method for initiating a wireless network to be used to connect an electronic device among a set of first-type electronic devices with a second-type electronic device.

A method 400 for initiating a wireless network to be used to connect an electronic device among a set of first-type electronic devices 200 with a second-type electronic device 300 will now be discussed in more detail in connection with FIG. 2. The method 400 comprises the following acts/steps. The order of listing the acts/steps below are not to be seen as a dedicated order of execution of the acts/steps, instead the acts/steps may be performed in any suitable order.

Receiving S412 data pertaining to a user-id 132. The data pertaining to a user-id 132 is preferably received at the service server 100. Receiving S412 data pertaining to the user-id 132 may comprise one or more of: registering a personal identification of the user, registering a biometric identification of the user, receiving user input corresponding to a selection of the user-id in the database, and sending user credentials from the second-type electronic device 300 to the service server 100.

Retrieving S414 a unique network configuration 134 associated with the user-id 132. The unique network configuration 134 associated with the user-id 132 is preferably retrieved to from the database 130. As mentioned above, the unique network configuration 134 is known beforehand by the second-type electronic device 300. Optionally, the user-id 132 too may be known beforehand by the second-type electronic device 300. The second-type electronic device 300 may have gained this knowledge from a setup phase. The setup phase will be further elaborated on in connection with step/act S401 of the method 400.

Selecting S416 an electronic device among the set of first-type electronic devices 200. The act of selecting S416 is based on one or more of a battery status, and an available memory capacity of the electronic devices 200 of the set of first-type electronic devices 200. Hence, a best candidate for an electronic device 200 may be made. If the first-type electronic devices 200 are interchangeable from a functional point of view, the selection S416 need not consider any other factors. The selecting S416 of the electronic device among the set of first-type electronic devices 200 is preferably made at the service server 100.

Sending S418, to the selected electronic device 200, the unique network configuration 134 associated with the user-id 132 for allowing the selected electronic device 200 to initiate a wireless network using the unique network configuration 134 associated with the user-id 132. Preferably, to allow the wireless network to connect the selected first-type electronic device 200 with the second-type electronic device 300, the unique network configuration 134 is common to the selected first-type electronic device 200 and the second-type electronic device 300. The selected electronic device 200 may in itself be configured to be able to set up a wireless network once the unique network configuration 134 has been received from the service server 100. In other words, the selected electronic device 200 does not necessarily need more information than the unique network configuration 134 from the service server 100 and may even initiate the wireless network in an un-docked state, i.e. in a state where it is not connected to the service server 100. The sending S418 of the network configuration 134 may cause the selected electronic device to act as a Wi-Fi access point or a Wi-Fi router, as explained above.

The acts/steps of receiving S412, retrieving S414, selecting S416, and sending S418 may all be executed during an operational phase S410. The operational phase S410 may be run once every time one electronic device among the set of first-type electronic devices 200 is to be selected/checked-out for a session, e.g. a work shift. Once the work session is ended the selected/checked-out first-type electronic device 200 may be returned to the service server 100 and checked-in again. When the first-type electronic device 200 has been checked in, the network connection may be disconnected.

The method may further comprise a setup phase S401. The setup phase S401 may be initiated a first time a specific user-id is registered at the service server 100. During the setup phase S401 a specific user-id 132 is associated S402 with a unique network configuration 134. The unique network configuration 134 in association with the user-id 132 may be saved S406 in the database 130. Further, during the setup phase the unique network configuration 134 in association with the user-id 132 is provided S404 to the second-type electronic device 300. In this manner, the unique network configuration 134 in association with the user-id 132 may be known by the second-type electronic device 300. As discussed above, there are numerous ways to provide the unique network configuration 134 in association with the user-id 132 to the second-type electronic device 300.

Hence, the setup phase is performed when a second-type electronic device 300 and user-id 132 is to be paired. The second-type electronic device 300 and user-id 132 may or may not be associated with the same physical person. Once paired, the second-type electronic device 300 and user-id 132 do not need to go through the setup phase again. During the setup phase the second-type electronic device 300 is informed about which unique network configuration that a user-id is associated with. A user-id is thus given a unique network configuration and the unique network configuration is communicated to the second-type electronic device 300. The second-type electronic device 300 may be informed about the unique network configuration from the service server 100. Optionally, in order to increase the security of a connection, a certificate 136 between second-type electronic device 300 and the user-id 132 may be setup. The certificate 136 may be setup from the service server 100 and communicated to the second-type electronic device 300. The certificate 136 may be exchanged during the setup phase to verify the setup. The certificate 136 may be stored in the database 130 of the service server 100.

Accordingly, a key concept of the present method is that a network connection is established between a user-id of a first-type electronic device and a second-type electronic device, and not between the device-ids. The method is thus contrary to the common approach of establishing a network connection directly between hardware. The method may comprise a setup phase S401 and an operational phase S410 is suggested. The setup phase S401 is performed when a user-id 132 of a user of an arbitrary electronic device of the first-type electronic devices 200 and a second-type electronic device 300 is to be paired. The user of the second-type electronic device 300 and the user of the arbitrary electronic device of the first-type electronic devices 200 may or may not belong to the same physical person. Once paired, the pair of user-id 132 and second-type electronic device 300 do not need to go through the setup phase again. In the setup phase S401 the second-type electronic device 300 is informed about which unique network configuration 134 a user-id 132 of a user of an arbitrary electronic device of the first-type electronic devices 200 is associated with. Each user of an arbitrary electronic device of the first-type electronic devices 200 is associated with a unique network configuration 134. The operational phase S410 is performed at the start of every session where the second-type electronic device 300 (already provided with the user-id 132 and the unique network configuration 134) and any one of a set of first-type electronic devices 200 is connected to be used together, for example at the beginning of a work shift for a police officer. In the operational phase S410, one electronic device among the set of first-type electronic devices 200 is selected to be used during the session. The selected electronic device among the set of first-type electronic devices 200 is informed which unique network configuration 134 it is to use for the session. The selection of the electronic device among the set of first-type electronic devices 200 may be done based on device health parameters, and not based on the user-id, for example battery status, memory capacity, etc. Thus, the selected electronic device may be different devices between sessions. Upon the network has been setup by the selected first-type electronic device 200 the second-type electronic device 300 can connect to the network since it recognizes this network from the setup phase S401. Thus, the second-type electronic device 300 can automatically connect to the selected first-type electronic device 200 assigned to the user for that session thanks to the setup phase S401 where the user-id and the second-type electronic device 300 have been paired. The operational phase S410 can be repeated for paired user-ids and second-type electronic devices 300 that have gone through the setup phase S401. Thus, there is no need for performing the setup phase S401 again before a new round of the operational phase S410.

The person skilled in the art realizes that the present invention by no means is limited to the preferred embodiments described above. On the contrary, many modifications and variations are possible within the scope of the appended claims.

For example, during the setup phase any one of the electronic devices 200 in the set of first-type electronic devices 200 may be used to initiate a wireless network using the unique network configuration 134 associated with the user-id 132. This since the connection is user-id specific and not device specific. Indeed, the network which provides the connection is user-id specific. The setup phase S401 may further comprise receiving information from said any one of the electronic devices 200 in the set of first-type electronic devices 200 that the second-type electronic device 300 has successfully connected to said any one of the electronic devices 200 in the set of first-type electronic devices 200. The act of saving S406 the unique network configuration 134 associated with the user-id 132 in the database 130 may be performed on a condition that the information that the second-type electronic device 300 has successfully connected to said any one of the electronic devices 200 in the set of first-type electronic devices 200 has been received.

Further, several second-type electronic devices 300 may connect a same first-type electronic devices 200 associated with one specific user-id at the same time as long at the different second-type electronic devices 300 have been setup to be paired with the specific user-id.

Additionally, variations to the disclosed embodiments can be understood and effected by the skilled person in practicing the claimed invention, from a study of the drawings, the disclosure, and the appended claims.

The invention claimed is:

1. A method for initiating a Wi-Fi network to be used to connect an electronic device among a set of portable first-type electronic devices with a second-type electronic device, the method comprising:
   receiving, at a service server configured to service the set of first-type electronic devices, data pertaining to a user-id;
   retrieving, from a database, a unique network configuration which is associated with the user-id and not device-id specific, wherein the unique network configuration is known beforehand by the second-type electronic device;
   selecting, at the service server, an electronic device among the set of first-type electronic devices; and
   sending, to the selected electronic device, the unique network configuration associated with the user-id for allowing the selected electronic device to initiate a Wi-Fi network using the unique network configuration associated with the user-id.

2. The method according to claim 1, wherein the act of selecting an electronic device among the set of first-type electronic devices is based on one or more of a battery status, and an available memory capacity of the electronic devices of the set of first-type electronic devices.

3. The method according to claim 1, wherein the user-id is known beforehand by the second-type electronic device and receiving data pertaining to the user-id comprises one or more of: registering a personal identification of the user, registering a biometric identification of the user, receiving user input corresponding to a selection of the user-id in the database, and sending user credentials from the second-type electronic device to the service server.

4. The method according to claim 1, wherein the acts of claim 1 form part of an operational phase, wherein the method further comprises a setup phase configured to be executed before the operational phase, the setup phase comprising:
   associating the user-id with the unique network configuration;
   providing the second-type electronic device with the unique network configuration in association with the user-id; and
   saving the unique network configuration in association with the user-id in the database.

5. The method according to claim 4, wherein providing the second-type electronic device with the unique network configuration in association with the user-id comprises one or more of: providing a QR-code, providing a bar code, inputting the unique network configuration manually, transmitting the unique network configuration from the service server, retrieving the unique network configuration from the database.

6. The method according to claim 4, wherein the setup phase further comprises:
   sending, to any one of the electronic devices in the set of first-type electronic devices, the unique network configuration associated with the user-id for allowing the any one of the electronic devices in the set of first-type electronic devices to initiate a Wi-Fi network using the unique network configuration associated with the user-id; and
   receiving information from said any one of the electronic devices in the set of first-type electronic devices that the second-type electronic device has successfully connected to said any one of the electronic devices in the set of first-type electronic devices,
   wherein the act of saving the unique network configuration associated with the user-id in the database is performed on a condition that the information that the second-type electronic device has successfully connected to said any one of the electronic devices in the set of first-type electronic devices has been received.

7. The method according to claim 1, wherein the act of sending the unique network configuration includes causing the selected electronic device to act as a Wi-Fi access point or Wi-Fi router.

8. A non-transitory computer-readable recording medium having stored thereon instructions for implementing the method according to claim 1, when the instructions are executed on a device having processing capabilities.

9. A service server configured to service a set of portable first-type electronic devices, the service server comprising control circuitry configured to execute:
- a user-id function configured to receive data pertaining to a user-id;
- a network configuration retrieving function configured to retrieve, from a database, a unique network configuration which is associated with the user-id and not device-id specific;
- an electronic device selecting function configured to select an electronic device among the set of first-type electronic devices; and
- a wireless network set-up function configured to send, to the selected electronic device, the unique network configuration associated with the user-id for allowing the selected electronic device to initiate a Wi-Fi network using the unique network configuration associated with the user-id.

10. The service server according to claim 9, wherein the control circuitry is further configured to execute a setup function configured to:
- associate the user-id with the unique network configuration;
- provide the unique network configuration in association with the user-id to a second-type electronic device; and
- save the unique network configuration in association with the user-id in the database.

11. The service server according to claim 9, wherein the electronic device selecting function is configured to base the selection on one or more of a battery status, and an available memory capacity of the electronic devices of the set of first-type electronic devices.

12. The service server according to claim 9, further comprising a plurality of docking bays for the electronic devices of the set of first electronic devices, wherein each of the docking bays is configured to charge one of the electronic devices extract data from the one of the electronic devices, and/or transfer data to the one of the electronic devices.

13. The service server according to claim 9, wherein the database forms part of the service server, and wherein the database comprises a plurality of unique network configurations associated with user-ids.

14. The service server according to claim 13, wherein the database further comprises certificates, each of the certificates being associated with one of the unique network configurations and one of the user-ids.

15. A system comprising a service server according to claim 9 and a plurality of first-type electronic devices constituting the set of first-type electronic devices.

16. The system according to claim 15, wherein the first-type electronic devices are portable digital video cameras, preferably body worn cameras.

* * * * *